US 11,812,115 B2

(12) United States Patent
Stevens et al.

(10) Patent No.: US 11,812,115 B2
(45) Date of Patent: Nov. 7, 2023

(54) MULTICAST ASSISTED DELIVERY (71) Applicant: BRITISH TELECOMMUNICATIONS PUBLIC LIMITED COMPANY, London (GB)

(72) Inventors: Timothy Stevens, London (GB); Rory Turnbull, London (GB); Stephen Appleby, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 17/433,414

(22) PCT Filed: Feb. 24, 2020

(86) PCT No.: PCT/EP2020/054777
§ 371 (c)(1),
(2) Date: Aug. 24, 2021

(87) PCT Pub. No.: WO2020/173878
PCT Pub. Date: Sep. 3, 2020

(65) Prior Publication Data
US 2022/0141542 A1 May 5, 2022

(30) Foreign Application Priority Data
Feb. 27, 2019 (EP) .................... 19159748

(51) Int. Cl.
H04N 21/6405 (2011.01)
H04N 21/2183 (2011.01)
(Continued)

(52) U.S. Cl.
CPC ..... H04N 21/6405 (2013.01); H04N 21/2183 (2013.01); H04N 21/222 (2013.01);
(Continued)

(58) Field of Classification Search
None
See application file for complete search history.

(56) References Cited

U.S. PATENT DOCUMENTS 6,574,795 B1 * 6/2003 Carr .................. H04N 21/454
725/123
6,973,667 B2 * 12/2005 Fritsch ............... H04N 21/6408
725/87
(Continued)

FOREIGN PATENT DOCUMENTS

CN 103004133 3/2013
CN 106233735 A 12/2016
(Continued)

OTHER PUBLICATIONS

Combined Search and Examination Report dated Dec. 21, 2020 issued in GB Application No. GB2012951.6 (6 pages).
(Continued)

Primary Examiner — An Son P Huynh
(74) Attorney, Agent, or Firm — Nixon & Vanderhye P.C.

(57) ABSTRACT

Described is a method of delivering content over a network using an approach referred to as "Multicast Assisted Unicast Delivery" (MAUD), as a multicast network is used to assist, rather than substituting for, an otherwise unicast path. Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast. Identifiers are introduced into each of the first and second components to aid recombination of the components to form
(Continued)

the original responses. The separation and recombination are handled by suitably configured proxy servers.

17 Claims, 10 Drawing Sheets

(51) Int. Cl.
    *H04N 21/222*     (2011.01)
    *H04N 21/266*     (2011.01)
    *H04N 21/643*     (2011.01)
    *H04N 21/845*     (2011.01)
    *H04N 21/6408*     (2011.01)

(52) U.S. Cl.
    CPC ... *H04N 21/26616* (2013.01); *H04N 21/6408* (2013.01); *H04N 21/64322* (2013.01); *H04N 21/8456* (2013.01)

(56) References Cited

U.S. PATENT DOCUMENTS

| | | | | |
|---|---|---|---|---|
| 7,404,201 B2* | 7/2008 | Takeuchi | ........... | H04N 7/17336 725/86 |
| 8,713,195 B2* | 4/2014 | Pickens | ........... | H04L 1/1809 709/231 |
| 9,059,916 B2* | 6/2015 | Hwang | ........... | H04L 47/15 |
| 9,178,709 B2* | 11/2015 | Higashida | ........... | H04L 12/1836 |
| 9,380,091 B2* | 6/2016 | Bao | ........... | H04N 21/23406 |
| 9,673,996 B1 | 6/2017 | Upadhyay | | |
| 9,871,666 B2* | 1/2018 | Hennig | ........... | H04L 12/1886 |
| 10,129,855 B1* | 11/2018 | Naim | ........... | H04L 12/1881 |
| 10,257,077 B1 | 4/2019 | Zhu | | |
| 10,412,343 B2* | 9/2019 | Kwan | ........... | H04N 7/17318 |
| 10,972,761 B2* | 4/2021 | Ra | ........... | H04N 21/8456 |
| 2002/0118689 A1* | 8/2002 | Luijten | ........... | H04L 49/103 370/389 |
| 2002/0124262 A1* | 9/2002 | Basso | ........... | H04N 7/17336 725/110 |
| 2004/0078624 A1* | 4/2004 | Maxemchuk | ........... | G06F 11/1443 714/4.2 |
| 2006/0143669 A1* | 6/2006 | Cohen | ........... | H04N 21/472 348/E7.071 |
| 2007/0107026 A1* | 5/2007 | Sherer | ........... | H04N 21/23406 348/E5.003 |
| 2010/0043022 A1* | 2/2010 | Kaftan | ........... | H04N 21/64784 725/34 |
| 2011/0239262 A1* | 9/2011 | Yang | ........... | H04N 21/26616 725/109 |
| 2012/0072901 A1 | 3/2012 | Hessenauer et al. | | |
| 2012/0170578 A1* | 7/2012 | Anumala | ........... | H04L 45/16 370/390 |
| 2012/0259994 A1* | 10/2012 | Gillies | ........... | H04L 65/1083 709/231 |
| 2013/0124683 A1* | 5/2013 | Watanabe | ........... | H04N 21/266 709/217 |
| 2014/0282777 A1* | 9/2014 | Gonder | ........... | H04N 21/2225 725/116 |
| 2015/0180672 A1* | 6/2015 | Kuwata | ........... | H04L 12/1836 370/254 |
| 2015/0207838 A1* | 7/2015 | Gabin | ........... | H04L 65/80 709/219 |
| 2016/0269794 A1 | 9/2016 | Shimura | | |
| 2016/0323348 A1 | 11/2016 | Bradbury et al. | | |
| 2016/0380890 A1 | 12/2016 | Hennig et al. | | |
| 2017/0063684 A1 | 3/2017 | Stokking | | |
| 2017/0118263 A1 | 4/2017 | Crabtree | | |
| 2017/0127147 A1* | 5/2017 | Crabtree | ........... | H04N 21/8456 |
| 2019/0190971 A1 | 6/2019 | Chen | | |
| 2019/0191212 A1* | 6/2019 | Sljivic | ........... | H04N 21/4384 |
| 2022/0131920 A1* | 4/2022 | Turnbull | ........... | H04L 65/75 |
| 2022/0141543 A1 | 5/2022 | Turnbull et al. | | |

FOREIGN PATENT DOCUMENTS

| | | |
|---|---|---|
| CN | 106464932 | 2/2017 |
| CN | 107257268 | 10/2017 |
| EP | 1 398 938 | 3/2004 |
| EP | 2 597 824 | 5/2013 |
| EP | 2670109 A1 | 12/2013 |
| EP | 2 695 326 | 2/2014 |
| EP | 3 127 334 | 2/2017 |
| GB | 2583020 | 10/2020 |
| GB | 2583020 A | 10/2020 |
| JP | 2018-129599 | 8/2018 |
| WO | 2012/138909 | 10/2012 |
| WO | 2016/107733 | 7/2016 |
| WO | 2018/073317 | 4/2018 |
| WO | 2018/097827 | 5/2018 |
| WO | 2020/173878 | 9/2020 |
| WO | 2020/173984 | 9/2020 |
| WO | 2022/037972 | 2/2022 |

OTHER PUBLICATIONS

Cabellabs, IP Multicast Adaptive Bit Rate Architecture Technical Report, V01 Oct. 26, 2016, Document Control No. OC-TR-IP-MULTI-ARCH-C01-161026 (69 pages).
3GPP TS 23.246 V16.1.0 (Sep. 2019) Multimedia Broadcast/Multicast Service (MBMS); Architecture and functional description (Release 16); 2019 (77 pages).
Adaptive media streaming over IP multicast DVB Document A176 (Second edition) Mar. 2020 (110 pages).
International Search Report and Written Opinion dated Nov. 2, 2021 issued for PCT/EP2021/071994 (14 pages).
International Preliminary Report on Patentability dated Sep. 10, 2021 issued for PCT/EP2020/054777 (8 pages).
International Preliminary Report on Patentability dated Sep. 10, 2021 issued for PCT/EP2020/054993 (8 pages).
Csaba Okrona: "What Is a HTTP HEADRequest Good for? Some Uses", Aug. 27, 2011 (Aug. 27, 2011), XP055139472,Retrieved from the Internet:URL:https://ochronus.com/http-head-request-good-uses/[retrieved on Sep. 10, 2014]the whole document (3 pages).
Chinese Office Action dated Dec. 2, 2022, issued for Chinese Application No. 202080016920.6 (12 pages).
Chinese Office Action dated Dec. 26, 2022, issued for Chinese Application No. 202080016552.5 (9 pages).
U.S. Appl. No. 17/433,414, filed Aug. 24, 2021, Multicast Assisted Delivery.
U.S. Appl. No. 17/433,738, filed Aug. 25, 2021, Multicast Assisted Delivery.
U.S. Appl. No. 18/019,362, filed Feb. 2, 2023, Content Delivery.
Office Action dated Oct. 6, 2022, issued for U.S. Appl. No. 17/433,738 (10 pages).
U.S. Appl. No. 18/019,362, filed Feb. 2, 2023 (18 pages).
International Preliminary Report on Patentability and Written Opinion of the International Searching Authority for International Application No. PCT/EP2021/071994, dated Feb. 16, 2023 (11 pages).
International Search Report for PCT/EP2020/054777 dated May 12, 2020, 3 pages.
Written Opinion of the ISA for PCT/EP2020/054777 dated May 12, 2020, 6 pages.
Search Report for EP19159748.3 dated Apr. 9, 2019, 8 pages.
Combined Search and Examination Report for GB1902640.0 dated Aug. 16, 2019, 6 pages.
Search Report for GB2002565.6 dated Jul. 13, 2020, 5 pages.
International Search Report and Written Opinion of the ISA for PCT/EP2020/054993 dated May 12, 2020, 12 pages.
Chinese Office Action dated Jul. 27, 2023 issued for Chinese Application No. 202080016552.5 (5 pages).
Chinese Office Action dated Aug. 10, 2023 issued for Chinese Application No. 202180055584.0 (5 pages).

* cited by examiner

MULTICAST ASSISTED DELIVERY

This application is the U.S. national phase of International Application No. PCT/EP2020/054777 filed Feb. 24, 2020 which designated the U.S. and claims priority to EP Patent Application No. 19159748.3 filed Feb. 27, 2019, the entire contents of each of which are hereby incorporated by reference.

FIELD OF THE INVENTION

This invention relates to the field of content delivery using a combination of unicast and multicast.

BACKGROUND TO THE INVENTION

Figure 1:
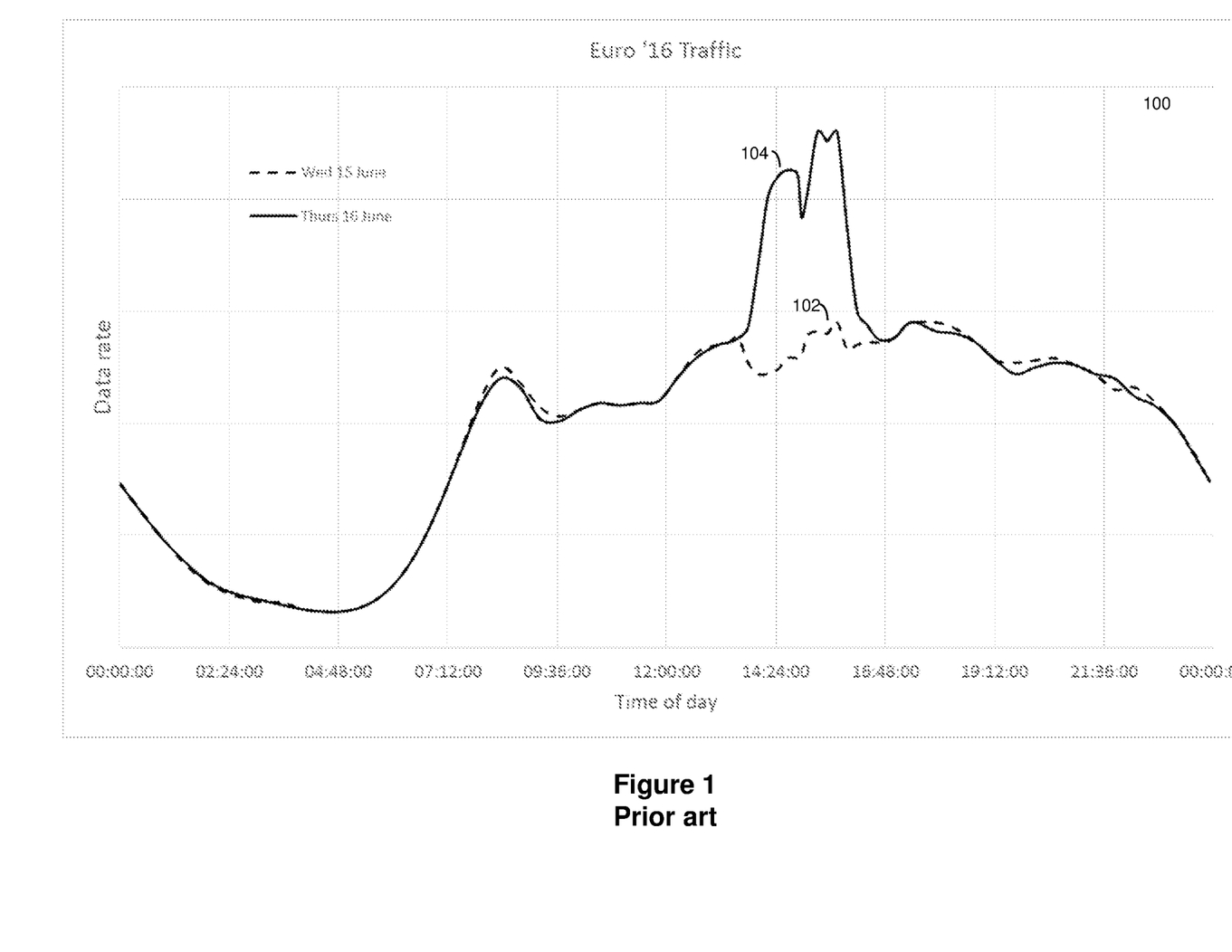
FIG. 1 is a graph showing traffic volume over a network on different days.

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed 15$^{th}$ June) without football, and plot 104 shows the traffic volumes the following day (Thu 16$^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such request/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples include: "IP Multicast Adaptive Bit Rate Architecture Technical Report" OC-TR-IP-MULTI-ARCH-001-161026, 26 Oct. 2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8 Mar. 2018).

Figure 2:
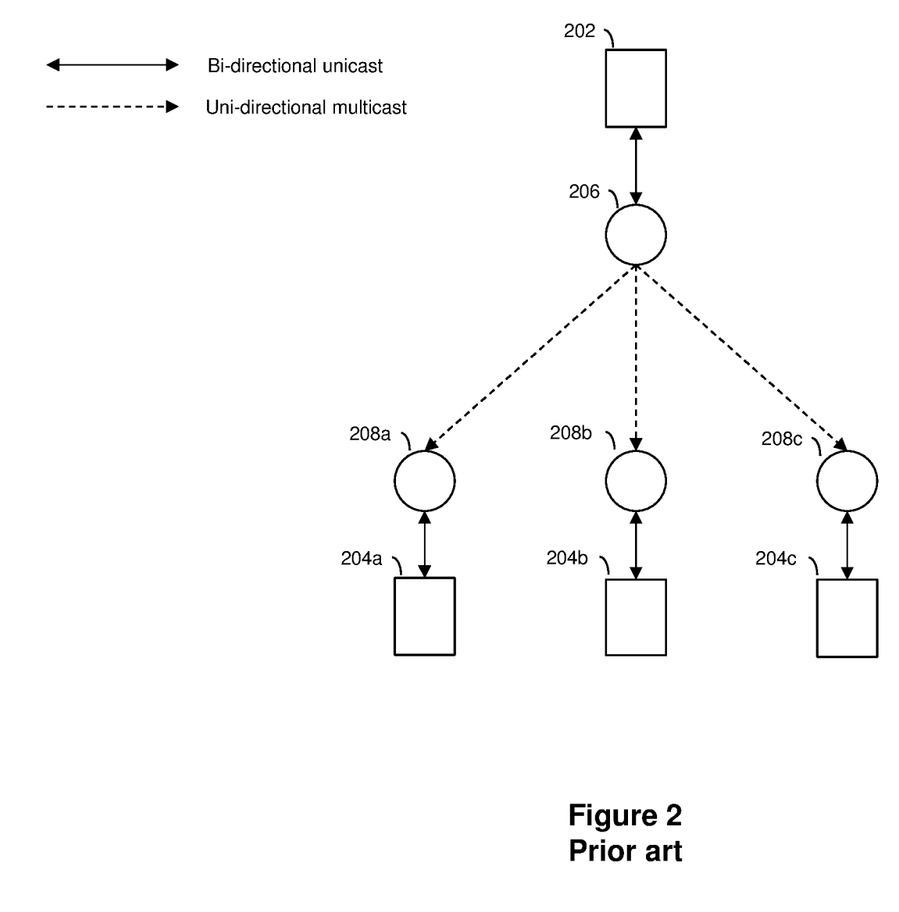
FIG. 2 is a network diagram of a general prior solutions.

FIG. 2 shows a generalised example of such solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X behaves as a client and independently makes requests for content segments and dispatches the entire response into the multicast network. Proxy X does this by first requesting a manifest file and then making timely requests for the content segments described within it. In some cases, the content server may require client devices to authenticate themselves with valid credentials before content is served. This is done by supplying Proxy X with valid credentials to be able to access content from content server 202. Thus, authentication is done using credentials configured at Proxy X 206 and not any credentials provided by the individual client devices. This is clearly not acceptable for content servers wishing to authenticate client devices on an individual basis, and is a deficiency of currently known systems.

Indeed, in such a solution, no session or client specific information is passed from the individual client devices 204a, 204b and 204c to the content server 202. Examples of session specific information include authentication tokens or cookies supplied to client devices that have successfully authenticated (e.g. for a subscription service). These are typically required by content servers and validated before a content server will respond with the requested content, and often the token or cookie will be updated by the content server before being sent back to the client device. This modified session specific data is also not provided in response to individual client devices in current solutions, as only a common response is provided to all client devices using multicast.

Furthermore, in current arrangements, Proxy X behaves as a client, requesting content from the content server and pushing the responses over multicast to the Proxy Ys. The client devices will request content from the Proxy Ys independently of the requests being made by Proxy X to the content server. This means there is a possible race condition, where the client devices request media segments via Proxy Y before Proxy X has requested and pushed the these back to Proxy Y, which may result in some content being delivered twice to Proxy Y (once over unicast and once over multicast). This can be solved either by delaying the response from Proxy Y until the relevant segment arrives, or manipulating the manifests returned to the client devices to ensure that the Proxy X is able to request and push content before the client devices make their requests. Neither solution is optimal.

SUMMARY OF THE INVENTION

It is the aim of examples of the present invention to provide an improved method of content delivery.

According to one example of the invention, there is provided a method of delivering content to a client device in a network comprising a plurality of client devices, said method comprising:
- sending a request for content to a content server from one of the client devices;
- receiving at a first network node a response to the request from the content server;
- separating by the first network node the response into a first component and a second component, wherein the first component comprises client specific data applicable to the client device requesting the content, and wherein the second component comprises common data applicable the plurality of client devices;
- sending by the first network node the first component over a unicast network to a second network node, and sending the second component over a multicast network to the second network node;
- receiving the first and second components at the second network node;
- regenerating by the second network node the response by combining the first component with the second component; and
- sending the regenerated response to the requesting client device.

The first and second components may have common content identifier associated with them, and the combining of the first component with the second component uses the common content identifier.

The request may comprise an HTTP GET request. The second component may comprise the content requested.

The second component sent over a multicast network to a second network node may be sent to other network nodes. The second network node together with the other network nodes may form a cohort, and the second component may comprise data applicable to the cohort.

The request for content may be sent over a unicast network to the content server. The content may be media content comprising a video sequence.

According to a further example of the invention, there is provided a system for delivering content to a client device in a network comprising a plurality of client devices, a first proxy server, a second proxy server, and a content server, wherein:
- the first proxy server is adapted to receive from the content server a response to a request for content, and to separate the response into a first component and a second component, wherein the first component comprises client specific data applicable to the client device requesting the content, and wherein the second component comprises common data applicable the plurality of client devices;
- the first proxy server further adapted to send the first component over a unicast network to the second proxy, and sending the second component over a multicast network to the second proxy server; and
- the second proxy server adapted to receive the first and second components, and to regenerate the response by combining the first component with the second component, and to send the regenerated response to the requesting client device.

With this approach, client specific information can be carried in both the request from the client device and the associated response. Thus, authentication tokens or cookies can be updated by the content server and delivered back to the client device as part of the first component response header. Client specific information is often contained in, but not limited to cookies. It could be other information carried in specific header fields or even within a portion of the body. As long as its location is known, it can be split from the second component common to all client devices, and delivered over the unicast response path.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of delivering content over network using an approach referred to here as "Multicast Assisted Unicast Delivery" (MAUD), as a multicast network is used to assist, rather than substituting for, an otherwise unicast path. Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast. Identifiers are introduced into each of the first and second components to aid recombination of the components to form the original responses. The separation and recombination are handled by suitably configured proxy servers.

Figure 3:
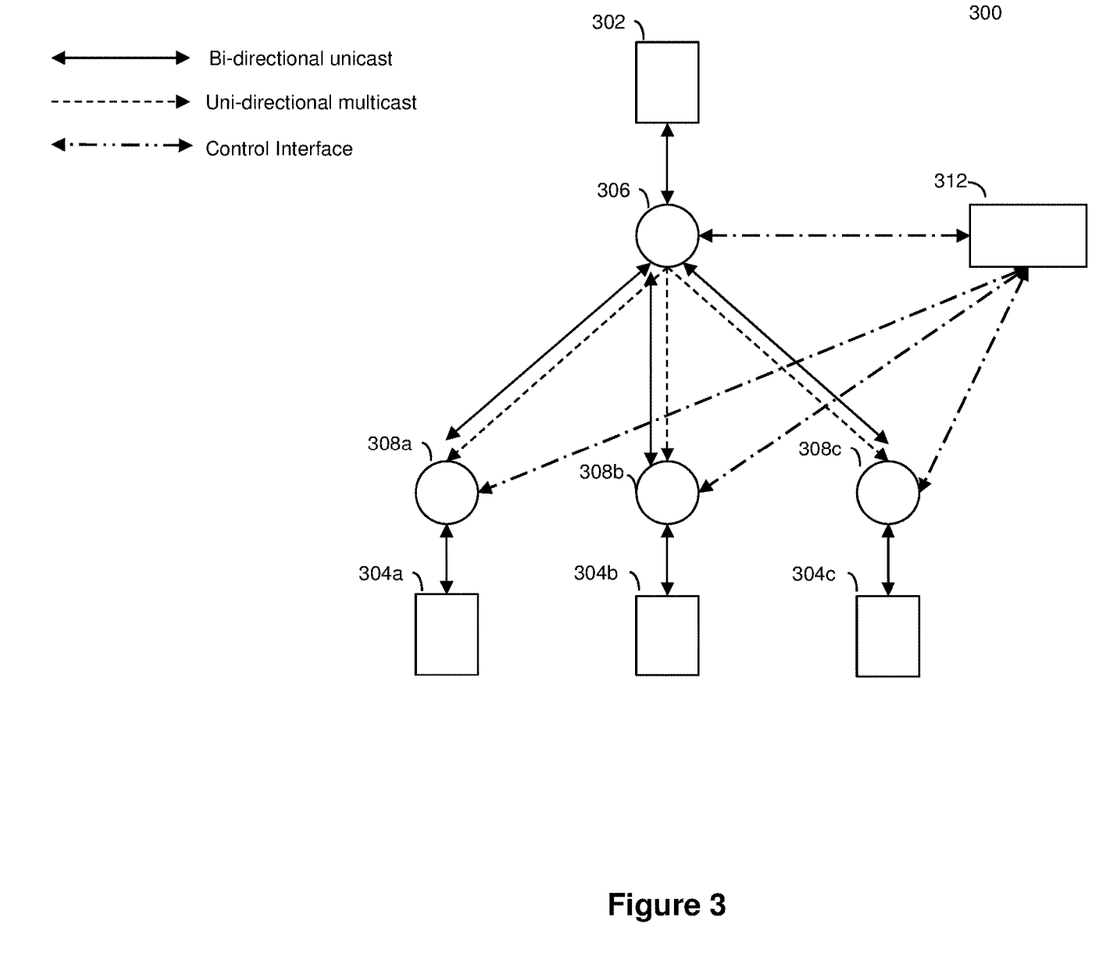
FIG. 3 is a network diagram showing the main components of an example of the present invention.

FIG. 3 shows the main components of a "Multicast Assisted Unicast Delivery" (MAUD) network. The network 300 comprises a content server 302, a Proxy X 306, Proxy Ys 308a, 308b, and 308c, client devices 304a, 304b and 304c, and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over both unicast and multicast. The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network.

The client devices are assumed to be running respective client applications, which are the source of content requests. For simplicity, the term client device from hereon in is used to refer to a client device running a client application. The client devices can make HTTP unicast requests for content held at the content server 302. The mechanism for delivery of that content is set out in examples of the present invention, where a multicast assisted unicast delivery (MAUD) approach is described.

The multicast controller 312 (MCC) monitors the operation of Proxy X and the Proxy Ys to determine which traffic should use multicast assistance (MAUD), and controls the proxies accordingly. Thus, in examples of the invention, the client devices may receive some traffic from the content server 302 directly over unicast, and other traffic using MAUD.

Many HTTP requests made by the client devices for content will not make use of MAUD, and are sent directly to the content server.

Other requests for content from a client device that may benefit from MAUD are redirected to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and proxy Y to exist in different domains, which would often be the case.

Other mechanisms to insert proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

Figure 4:
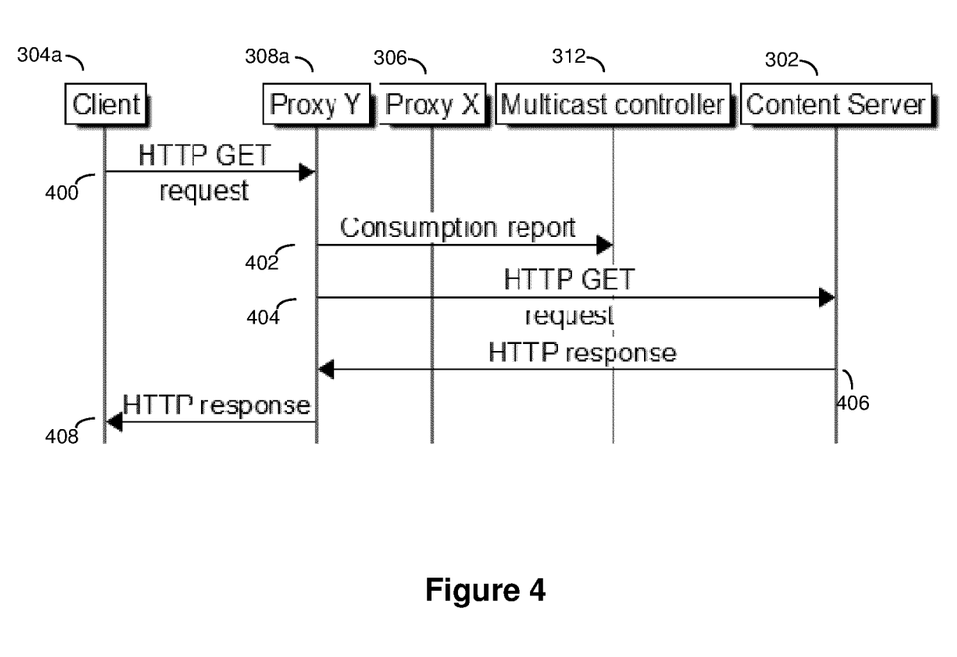
FIG. 4 is a message flow diagram for the initial process in an example of the present invention.

Reference is now made to FIG. 4, which shows a message flow diagram between client device 304a, Proxy Y 308a, Proxy X 306, multicast controller 312, and the content server 302, for the initial MAUD process.

In step 400, client device 304a makes an HTTP GET request for content. The request is received by Proxy Y 308a. Proxy Y 308a then sends a consumption report in step 402 to the multicast controller 312 over a control interface path (see dot-dashed line FIG. 3). The consumption report includes information on the HTTP request/response pairs being passed through the proxy e.g. the URL of the HTTP request.

Proxy Y 308a also forwards the HTTP GET request to the content server 302 in step 404. The content server 302 responds with an HTTP response containing the requested content. The response is received by Proxy Y 308a and sent to the client device 304a. The content can then be viewed by the client device 304a.

Note, all the HTTP requests and responses thus far are unicast in nature.

Now, it should be further noted that requests for the same content might be made by other client devices. This is typical during for example a live football match. In such a situation the process of FIG. 4 will be repeated by a number of client devices and associated Proxy Ys, each sending consumption reports to the multicast controller 312 for their respective client devices.

The multicast controller 312 uses the received reports to decide whether the HTTP requests reported from a given population of Proxy Ys justifies the use of multicast for their responses. Such a population of Proxy Ys is referred to as a 'cohort'. Assuming certain conditions are satisfied (for example greater than a certain number of client devices requesting the same content), the multicast controller 312 will configure Proxy X and any relevant Proxy Ys (that is the cohort) for multicast assisted delivery.

Figure 5:
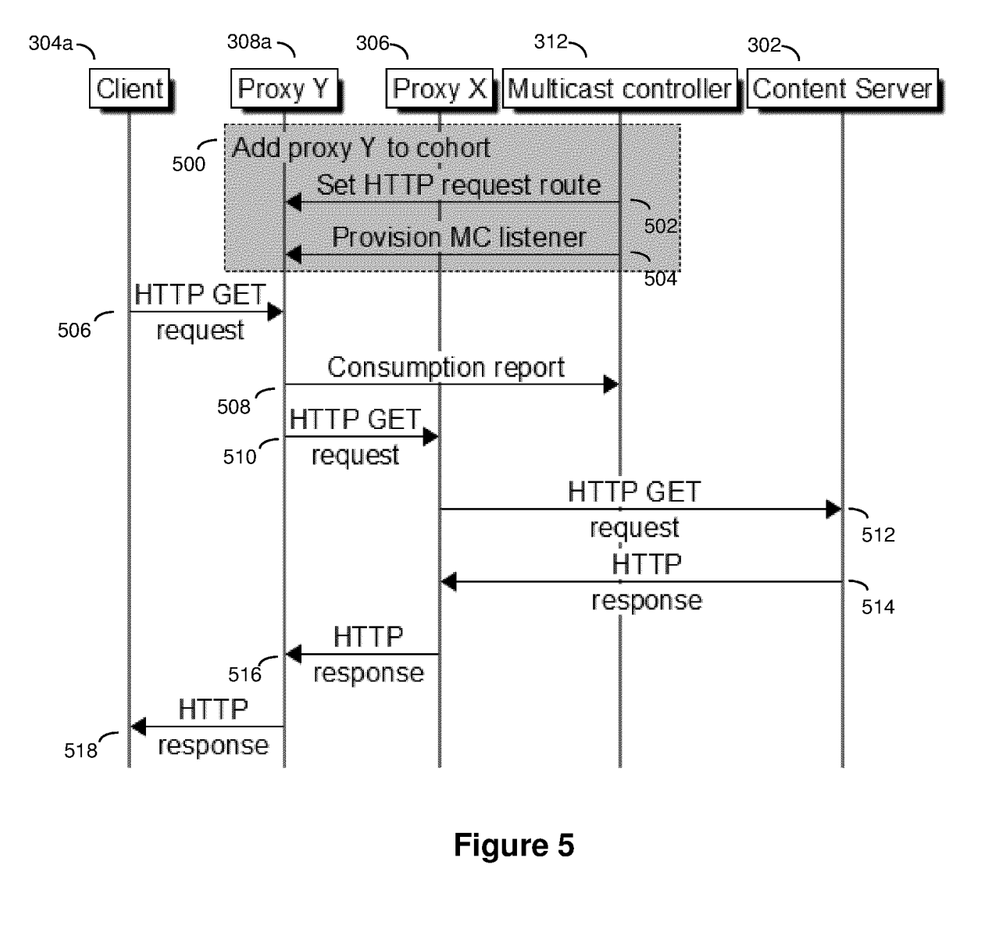
FIG. 5 is a further message flow diagram for a later part of the process in an example of the present invention.

FIG. 5 shows a message flow diagram of the process of adding a single Proxy Y 308a to a cohort for multicast assisted delivery, which initially takes place in step 500. Note in practice, there will be many client devices making requests and thus possibly many associated Proxy Ys that will follow this same logic and be added to the same cohort.

In step 500, Proxy Y 308a is added to a cohort by the multicast controller 312. The multicast controller 312 does so in step 502 by sending Proxy Y 308a instructions to set up an HTTP request route, whereby requests matching a particular URL path/pattern/string are directed to Proxy X 306.

For example, the multicast controller 312 might send "t2-btsport-live-hls-prod.akamaized.net" as a matching pattern to Proxy Y 308a. Then any requests for URLs originating from a client device that match that pattern will be redirected by to Proxy X 306. The URL does not necessarily have to match in its entirety, but just have within it the matching pattern. For example, a client device may request a URL such as https://t2-btsport-live-hls-prod.akamaized-.net/out/u/bts1/bts1_7.m3u8 for a manifest, or https://t2-btsport-live-hls-prod.akamaized.net/out/u/bts1/bts1_7_15055280.ts?m=1543850508m=1543850508 for a video segment. Proxy Y 308a would forward these requests to Proxy X 306 as they have URLs that at least in part match the pattern specified by the multicast controller 312 in step 502.

Then in step 504, the multicast controller 312 also sends Proxy Y 308a instructions to provision a multicast listener. The instructions tell Proxy Y 308a to prepare to receive multicast, as Proxy X may choose to send some responses over multicast (for example, responses to the requests that Proxy Y has sent up to Proxy X, from the matching "t2-btsport-live-hls-prod.akamaized.net" pattern). The multicast listener causes Proxy Y to issue an IGMP join command to a multicast address specified by the multicast controller. Multicast may or may not arrive on this interface, depending on what Proxy X chooses to send (see discussion later on Proxy X set-up).

Note, steps 502 and 504 could be implemented as a single step: the multicast controller's instruction to Proxy Y to monitor for a matching pattern can also tell Proxy Y to provision a multicast listener.

Then in step 506 when the client device 304a next sends an HTTP GET request for content, the request is received by Proxy Y 308a, and Proxy Y 308a checks to see if it matches the match pattern set out in step 502. In this case it does. Proxy Y 308a can optionally send a consumption report (as in step 402) to the multicast controller 312 in step 508, as well as redirecting the HTTP GET request onto Proxy X 306 (instead of to the content server 302 directly) in step 510.

In step 512, Proxy X 306 sends the received HTTP GET request to the content server 302. In step 514, the content server 302 responds by sending the requested content in an HTTP response to Proxy X 306. In Step 516, Proxy X 306 forwards the response onto Proxy Y 308a. Then in step 518, the response is forwarded by Proxy Y 308a to the client device 304a.

The process described thus far shows how Proxy Y 308a is set-up to forward certain HTTP requests to Proxy X (step 502), and also to provision itself as a multicast listener (step 504) ready to receive multicast traffic. However, at this point there is no multicast traffic yet as Proxy X 306 has not yet been configured to send any multicast traffic. All the HTTP requests and responses so far are unicast in nature.

Figure 6:
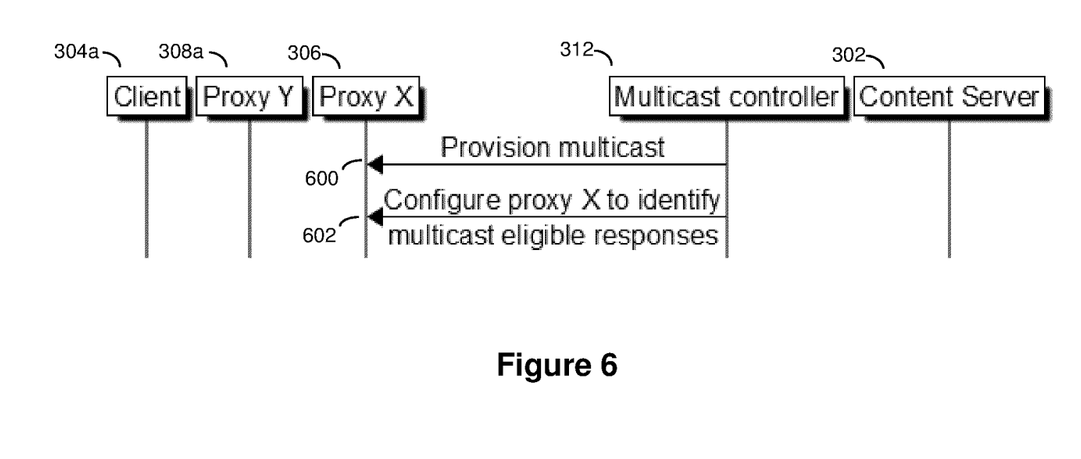
FIG. 6 is another message flow showing how one of the proxies is established for multicast use in an example of the present invention.

Referring now to FIG. 6. To allow the Proxy X 306 to use multicast for the return path for responses to requests that meet the match pattern set out in step 502, the multicast controller 312 sends instructions to instruct Proxy X to use multicast for certain responses sent by the content server in step 600. In step 602, the multicast controller configures Proxy X to identify those responses by selecting on file or MIME type. For example, the instruction could be to only use multicast assistance for responses that contain video MIME types such as "video/mp4" or "video/MP2T", so that only responses containing video traffic are split over multicast and unicast. Other file types will be sent over unicast only. So in this example, text, manifests, images (all non-video MIME types), will be sent over unicast even if the corresponding requests meet the URL match pattern from step 502.

In an alternative example, responses can be selected based on specific Etags or a range of Etags. Etags (Entity Tags) are part of the HTTP 1.1 specification and are used to uniquely identify response payloads.

After this point, Proxy X and Proxy Y are enabled to deliver HTTP responses using multicast assisted unicast delivery, with the resulting possible communications paths shown in FIG. 3—note the combination of both unicast and multicast paths between Proxy X and the Proxy Ys, but only unicast paths between the client devices and the Proxy Ys and also between Proxy X and the content server.

As highlighted earlier, the prior art solutions deliver an entire HTTP response, including both header and payload, over multicast. It is not possible to send responses that are different for different client devices as the multicast path is used to deliver identical content to all client devices.

In the new approach multicast assisted unicast delivery described here, this is overcome by separating the (unicast) responses to the HTTP GET requests into two components: one component containing all elements that may be different for different members of the cohort (typically the header from the response); and a second component containing elements that are common to all members of the cohort (typically the payload containing the content being requested). The common components are delivered over multicast and the individual components are delivered over unicast using the arrangement described above.

Therefore, the initial HTTP unicast request from the client device is forwarded to the content server via the associated Proxy Y and the Proxy X. However, the unicast response from the content server is split into the two components by Proxy X before being sent on: the different component being sent over unicast to the Proxy Y associated with the requesting client device, and the common component being sent over multicast to all Proxy Ys in the cohort. Re-assembly of the two components is handled by the associated Proxy Y, with the re-assembled response being sent over unicast to the client device.

The re-assembled response sent to the client device is identical to that which would have been provided to the client device had Proxy Y directly forwarded the initial unicast request to the content server and received the response over unicast directly from the content server. This is an important feature of the current approach, as all of the session information between the client device and the content server to be preserved. It thus removes the need for Proxy X to behave as a client device in its own right (providing its own authentication etc.), since Proxy X forwards requests from client devices with their own credentials intact, which may include authentication credentials. In many cases of practical interest, all session-specific information is contained in HTTP headers, whereas the response payloads may be shared by many endpoints.

Whilst the example below describes a method where the common component is in the payload of the initial response, with the different elements in the header, a person skilled in the art will appreciate that the same method can apply to other decompositions of the response which do not align with a perfect header/payload split.

Returning to FIG. 6, after the process described here, Proxy X 306 and Proxy Y 308a (and other Proxy Ys in the cohort) are enabled to deliver HTTP responses using multicast assisted unicast delivery. The first member of the cohort to next make a given request for content will trigger the use of multicast assistance to deliver the payload of the response over multicast from Proxy X 306 to all Proxys Y that are members of the relevant cohort, and the header of the response over unicast from Proxy X 306 to Proxy Y 308a associated with the requesting client device 304a. When a Proxy Y receives the payload, it stores it in an internal cache ready for processing.

It should be noted that there could be variations on the sequence described above. For example, the controller could instruct the Proxy X to use multicast before it instructs any Proxy Ys to join the cohort. The logical result will still be the same, although the loading on different components during the transition from unicast to multicast assisted delivery may be different.

A discussion now follows on how a response from the content server 302 may be separated by Proxy X 306 into the two components and delivered over two separate delivery paths to Proxy Ys for re-assembly.

In this example, Proxy X generates a client-specific component that contains the header portion of the original response from the content server, but does not include the payload from the original response, and further includes the following modifications to the header fields:

The 'Content-Length' attribute is set to zero to indicate that there is no payload;

An additional attribute (X-Content-Length) used to indicate the value of the original 'Content-Length' attribute; and An additional attribute (X-Content-Id) used as a content identifier to identify the associated payload.

Proxy X also generates a corresponding common component that contains the payload from the original response from the content server. The same content identifier (X-Content-Id) that is used in the client-specific component is also included with the common component before it is sent over multicast to Proxy Y. As the common component does not contain an HTTP header, the content identifier needs to be attached to the common component, which can be done for example using a suitable framing type such as QUIC, FLUTE, ROUTE, etc. In the following example, QUIC has been used.

Figure 10:
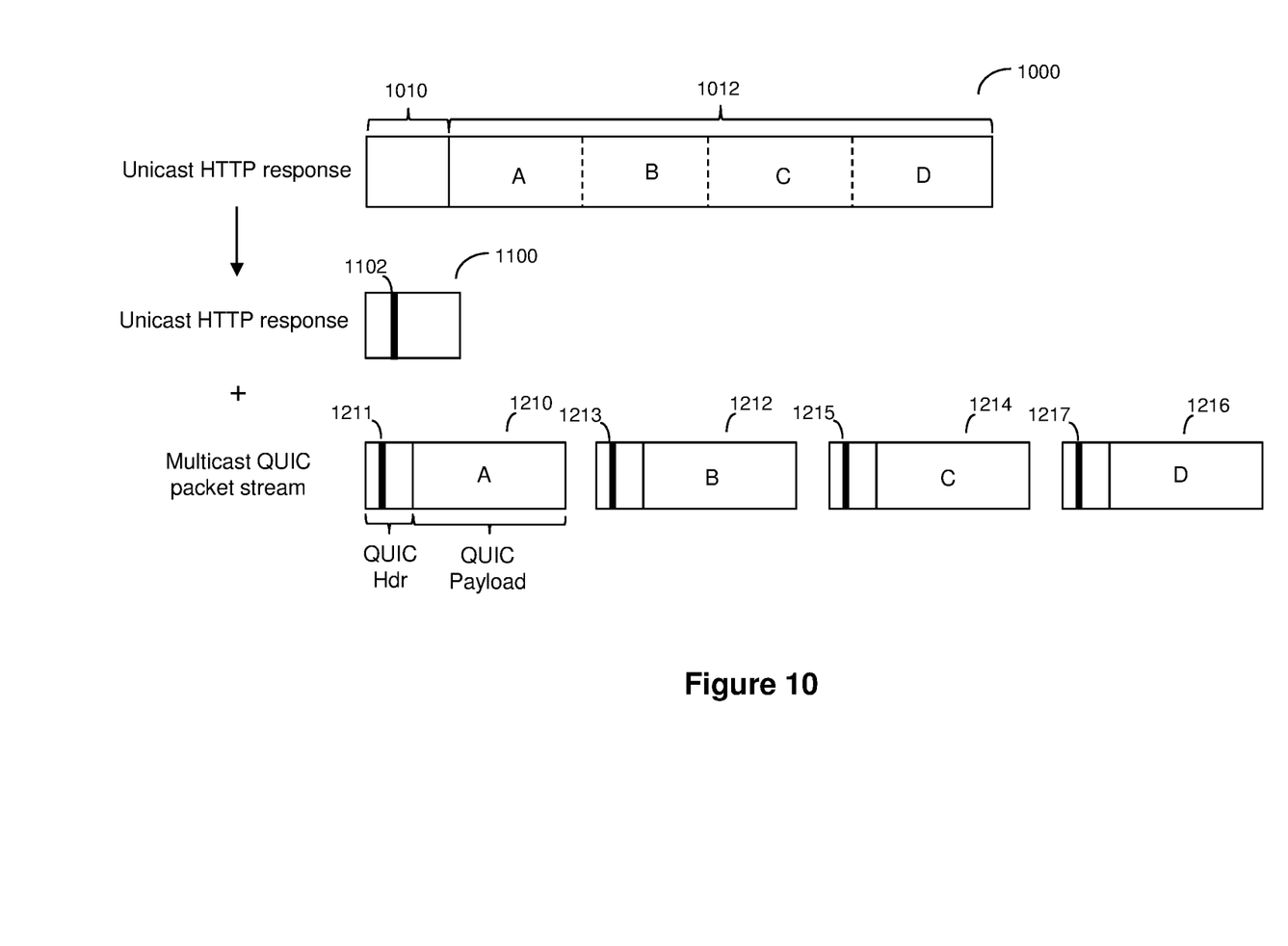
FIG. 10 illustrates the format of a response from the content server, and the resulting packet carrying the modified header and stream of QUIC packets carrying the payload in an example of the invention.

FIG. 10 shows an example of the formats of an HTTP response 1000, and the resulting HTTP packet 1100 carrying the modified header from the HTTP response, and the resulting stream of QUIC packets carrying the payload.

The HTTP response 1000 comprises a header portion 1010 (the client specific component) and a payload portion 1012 (the common component).

The HTTP response 1100 that is generated comprises the header 1010 from the HTTP response 1000, but modified as described earlier. This modified header includes the content identifier "X-Content-Id" marked here as 1102. This HTTP response will be sent by Proxy X over unicast to Proxy Y.

The QUIC packet stream comprises 4 QUIC packets 1210, 1212, 1214 and 1216. Each of the QUIC packets includes a QUIC header and a QUIC payload. The payload 1012 is carried in the QUIC packet payloads. However, as HTTP payloads are typically much larger than QUCI payloads, the HTTP payload 1012 is split into fragments A, B, C and D, and carried in respective QUIC packets 1210, 1212, 1214, and 1216. Each of the QUIC headers also include a content identifier "X-Content-Id" 1211, 1213, 1215, and 1217. "X-Content-Id" in the QUIC headers have the same value as the "X-Content-ID" 1102 in the modified header of the HTTP packet. A FIN bit in the final QUIC packet header is set to denote the end of the QUIC sequence of packets. Any further HTTP responses will have a corresponding stream of QUIC packets carrying the payload, but with a new content identifier.

The QUIC packets are carried over multicast UDP and sent to Proxy Y. Proxy Y receives the QUIC packets uses the "X-Content-Id" attribute to identify the QUIC payloads (A, B, C, and D) that need to be recombined to generate the original HTTP response payload. Once regenerated, the payload is stored in a cache in Proxy Y using the X-Content-ID as a key for use later.

The use of the same content identifier for the unicast and multicast packets allows the client-specific component to be linked to and later re-combined with the corresponding common component. The content identifier can be generated by Proxy X and uniquely identifies the payload. A more detailed discussion of the generation of content identifier follows later.

The client-specific component is sent over unicast from Proxy X to the relevant Proxy Y 308a associated with the requesting client device 304a. The common component is sent from Proxy X over multicast to (or subscribed to by) all Proxy Ys in the relevant cohort.

Now, when Proxy Y 308a receives the unicast response to the HTTP request, it will identify it as requiring additional processing because of the presence of the X-Content-Id attribute. To generate a response that can be forwarded to the client device 304a, Proxy Y 308a reverses the modification to the header made at Proxy X. Specifically, Proxy Y will restore the Content-Length field to its original value by using the value held in the X-Content-Length field, and remove the two additional attributes. The X-Content-Id is used as a retrieval key to identify the correct payload from those previously stored in the cache, where each of the payloads stored in the cache are indexed by the X-Content-Id attribute. The identified payload is then re-combined with the restored header to generate an exact copy of the original response that was sent by the content server 302 to Proxy X 306.

This response can then be sent over unicast to the client device 304a.

Figure 7:
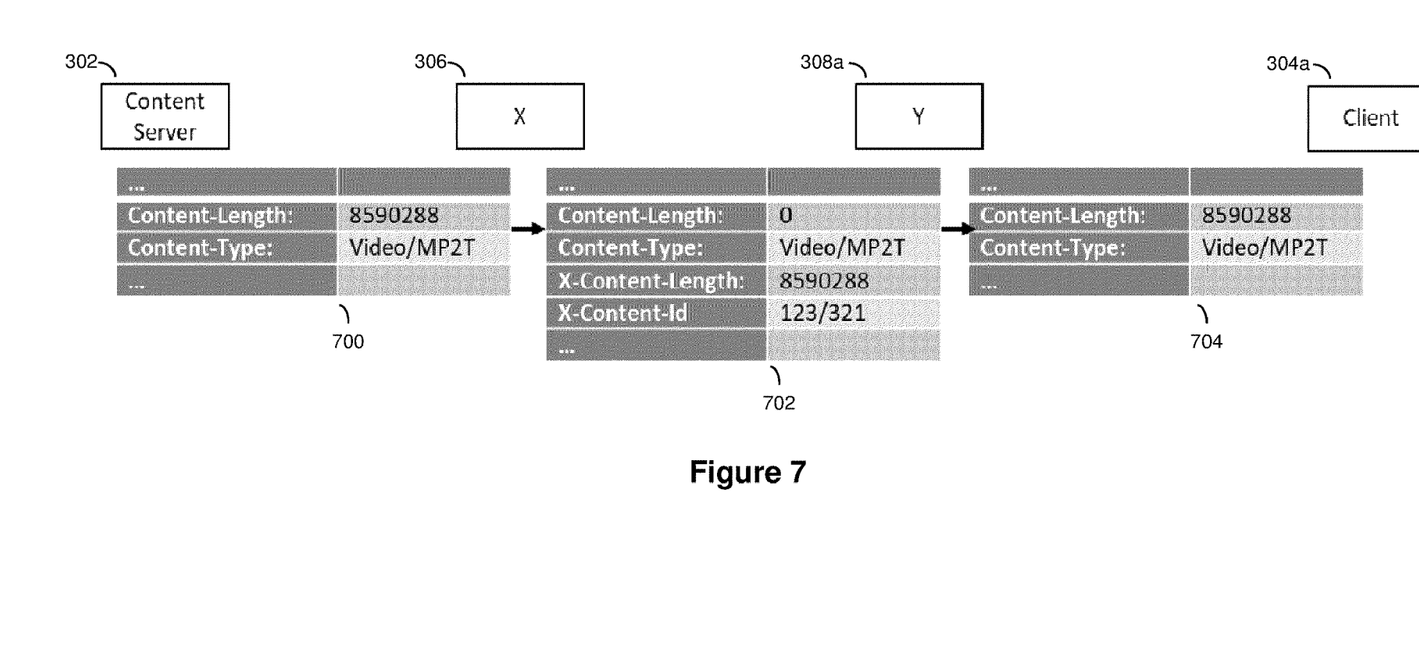
FIG. 7 shows examples of how the header is modified in responses in an example of the present invention.

FIG. 7 shows an example of how the header is modified in responses sent from the content server 302 to the client device 304a, by way of Proxy X 306 and Proxy y 308a, with the unmodified fields omitted for clarity. The response 700 is from the content server 302 to Proxy X 306, with a Content-Length field set to "8590288", and a Content-Type field set to "Video/MP2T".

Here it is assumed that Proxy X 306 has been previously set-up (see FIG. 6) to use multicast assistance for all content of type "Video/MP2T". Thus, when Proxy X 306 receives the response 700 over unicast, it creates a new response 702 by adding a further header field X-Content-Length and copies the length from the original Content-Length field into X-Content-Length, and then sets the value of Content-Length to zero. Proxy X also adds a header field X-Content-Id to response 702 and sets its value to the content identifier that is being used for the payload, here "123/321". The new response 702 is sent over unicast to Proxy Y 308a. Whilst the payload that is being sent separately over multicast is not shown in FIG. 7, it should be noted that it will have been allocated the same X-Content-Id value "123/321" used in response 702.

At Proxy Y 308a, the response 702 is re-assembled with the payload, using X-Content-Id as the key to correctly link the corresponding components. Once re-assembly is complete, the changes to the HTTP response header are reversed. Thus, a response comprising a header 704 and a payload carrying the requested content is served by Proxy Y to the client device 304a over unicast, with the header 704 being identical to the original header 700.

The first request from a client device for a given piece of content that triggers the use of multicast assistance is treated differently from subsequent requests for the same content from other client devices. This is because subsequent requests should not cause Proxy X to re-transmit an identical response payload over multicast, having already transmitted the payload in response to the first request, during the lifetime of the cohort. Note that the same piece of content could be transmitted multiple times by the Proxy X, but only once to each cohort instance.

Furthermore, if the response payload for a given piece of content has already been sent over multicast to the cohort, then Proxy X should ideally not make further requests for that content from the content server, since it will only be discarded by Proxy X. Alternatively, Proxy X could make a HTTP HEAD request so that session-specific header information can be received—see step 804 below.

The method used to determine whether a response payload has already been sent over multicast is to maintain a history of request/response records, each record containing a subset of data from each request and the corresponding response. One such history will be associated with each cohort.

Each record in the history would include the URL of the request and a content identifier, which uniquely identifies the payload of the response. The content identifier could be X-Content-Id, which is used to link the header and payload components and shown in FIG. 7. Proxy X is responsible for generating the content identifier, for example from the Proxy Y request or the content server's response, and allocating it to the client specific and common components.

Conveniently, if the content server provides one, the content identifier could simply be the "Entity Tag" (Etag) value, which are used to identify response payloads uniquely. If they are present, they are included in the header of an HTTP response.

Figure 8:
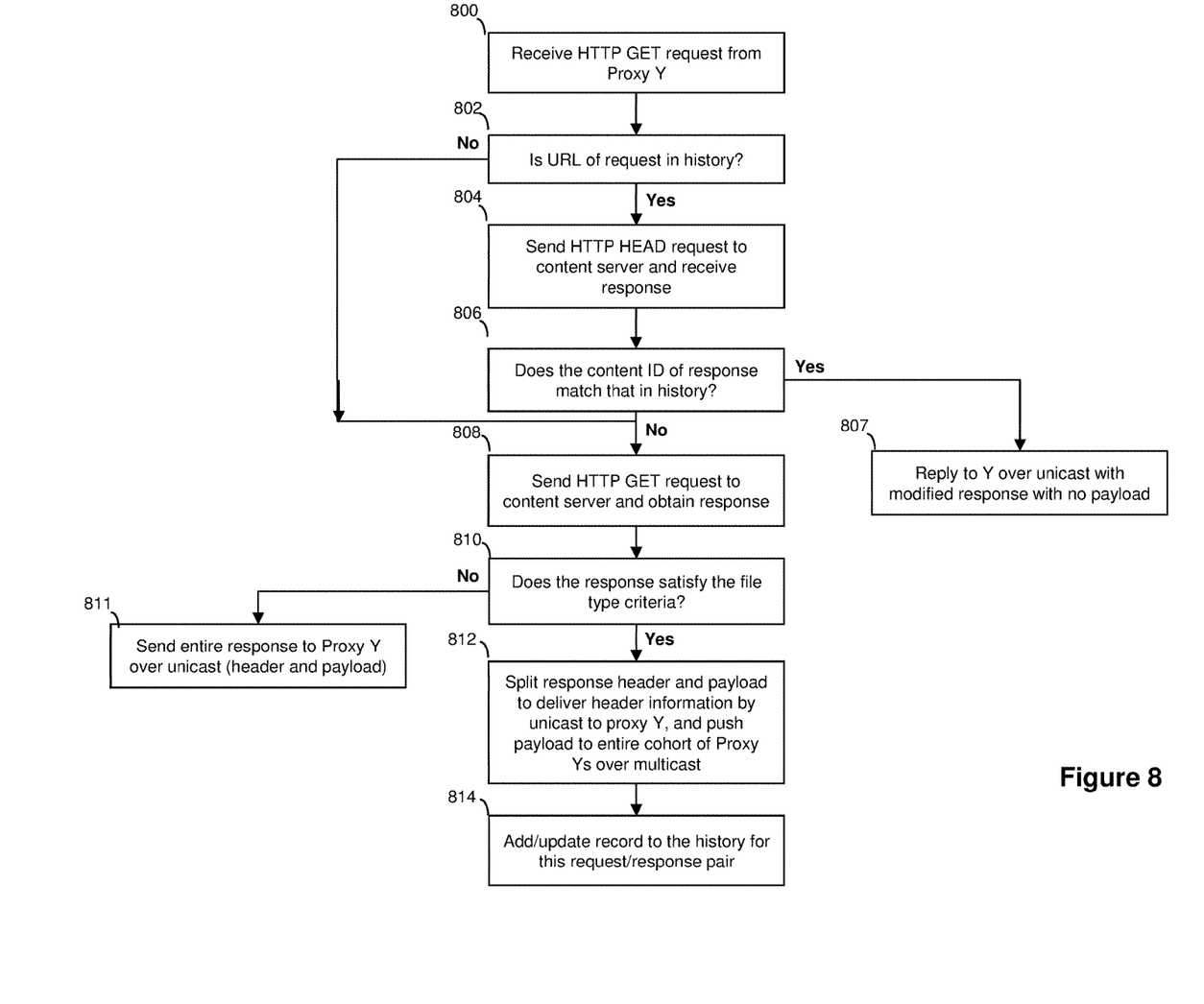
FIG. 8 is a flow chart showing the processing for one of the proxies in an example of the present invention.

FIG. 8 is a flow chart showing the logic for Proxy X 306 responding to a HTTP GET request for content from Proxy Y 308a.

In step 800, Proxy X 306 receives a HTTP GET request from Proxy Y 308a for a piece of content specified by a URL.

In step 802, Proxy X consults the history for the cohort Proxy Y 308a is associated with. If the URL used in the request is not present in the history, then processing passes to step 808 where Proxy X forwards the HTTP GET request received from Proxy Y 308a to the content server.

If, on the other hand, the URL used in the request is present in the history for the appropriate cohort, then processing passes to step 804, where Proxy X 306 sends an HTTP HEAD request to the content server. The HTTP HEAD request will cause the content server to return the header of the response, but not the payload (so the content requested in the original HTTP GET request is not included in the response).

In step 806, Proxy X 306 will generate a content identifier (for example, using any Etag in the header of the response) associated with the response and compare the generated content identifier with that stored the history corresponding to the URL of the request. If there is a match, processing passes to step 807, where Proxy X will return a modified response to Proxy Y 308a with a zero-length payload and will not push the content payload over multicast as it has already been sent according to the history.

If the generated content identifier for this request does not match that in the history record, then processing passes to step 808, where Proxy X sends an HTTP GET request to the content server in order to obtain the payload. This is the same request as was received from Proxy Y 308a in step 800. The response received is a unicast HTTP response, comprising a header and a payload.

In step 810, Proxy X checks to see if the response received from the content server satisfies the file type criteria, as set out in step 602. For example, the file/MIME type criteria could be "video/MP2T", and thus if the response does contain a "video/MP2T" MIME type payload, then processing passes to step 812. Otherwise if the response does not contain a "video/MP2T" MIME type payload, then processing passes to step 811.

So in step 811, the entire HTTP response (header and payload) is sent over unicast to Proxy Y 308a, and processing is complete.

Whereas in step 812, the HTTP response is split into a client-specific component (the header) and a common component (the payload). Both the header and payloads are allocated a suitable content identifier as described earlier. The header is also modified as described earlier (see above where header 700 is modified to header 702), before it is sent over unicast to Proxy Y 308a. Whereas the payload is pushed over multicast to the entire cohort that includes Proxy Y 308a.

Processing passes from step 812 to step 814.

In step 814, the history record for the request/response pair is added/updated at Proxy X.

Note that in some cases, content servers won't provide Etag values and may not accept HTTP HEAD requests. In such cases, the URL of the requested content could be used instead, although this would cause problems if the same URL is used to refer to changing content, as could happen for example with an HTTP Live Streaming (HLS) manifest.

Alternatively, a less efficient, but more reliable approach, would be for Proxy X to always send and HTTP GET requests to the content server (and not use HTTP HEAD requests), and derive its own content identifier (e.g. a hash value) from the returned payload.

Figure 9:
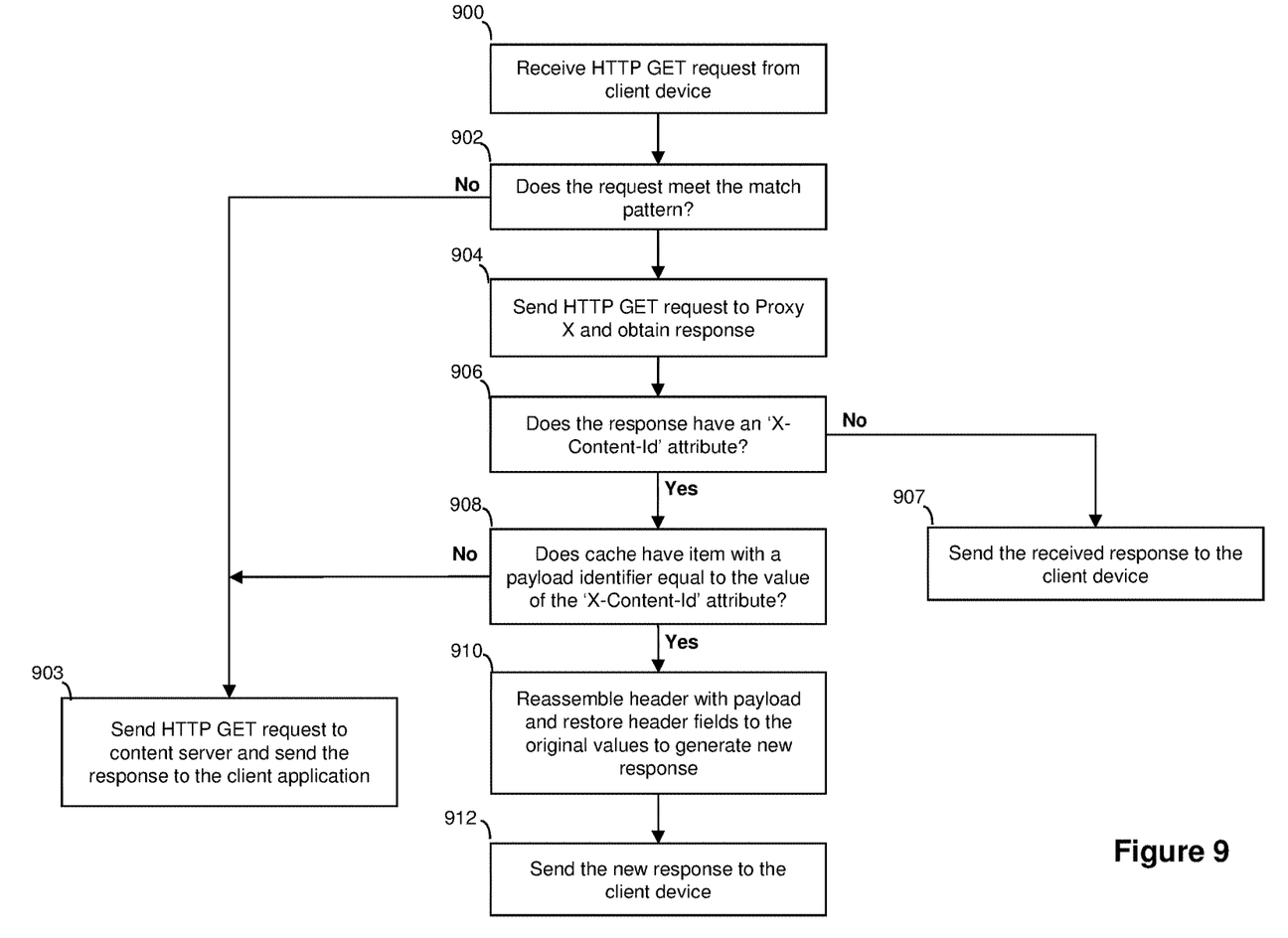
FIG. 9 is a flow chart showing the processing for one of the proxies in an example of the present invention.

FIG. 9 is a flow chart showing the processing for Proxy Y 308a receiving a HTTP GET request from the client device and how it uses cached payloads to help generate responses.

In step 900, a HTTP GET request for a piece of content is received by Proxy Y 308a from a client device over unicast.

In step 902, a check is made by Proxy Y 308a to determine if the request meets the predetermined match pattern. As described above in relation to step 502, requests that contain the match pattern are to be processed with multicast assistance, and thus forwarded to Proxy X in step 904.

However, if the request does not contain the match pattern, then processing continues without attempting multicast assistance and passes to step 903. In step 903, the received HTTP GET request is sent directly to the content server over unicast. The response from the content server is also sent over unicast, and after receiving it, Proxy Y 308a sends it to the client device over unicast.

In contrast, in step 904, the HTTP GET request is sent by Proxy 308a to Proxy X 306, and a response obtained. Then in step 906 Proxy Y 308a checks to see if the response contains the "X-Content-Id" attribute, which indicates the response received is subject to multicast assistance with the client-specific component delivered in this response and the common component delivered separately.

If the response does not contain the "X-Content-Id" attribute, then the response has not been subject to multicast assistance (and therefore the response has not been split into client-specific and common components), and so the entire response is sent directly to the client device over unicast.

However, if the response does contain the "X-Content-Id" attribute (the header will now resemble for example 702), then processing passes to step 908, where a check is made to determine if Proxy Y 308a has already received a corresponding common component identified by a content identifier equal to "X-Content-Id" from the response. Proxy Y 308a does so by checking its cache, which is where common components are stored with the content identifier as the key. If there is not a cache item with the same "X-Content-Id", then processing passes to step 903, where the received HTTP GET request is sent directly to the content server over unicast. The response from the content server is also sent over unicast, and after receiving it, Proxy Y 308a sends it to the client device over unicast.

If there is a cache item with the same "X-Content-Id", then processing passes to step 910, where the response header is re-assembled with the payload, using X-Content-Id as the key to link the corresponding header and payload components. The changes made (in step 812 by Proxy X) to the HTTP response header are also reversed. Thus, a new response comprising a header (see 704) and a payload carrying the requested content is generated by Proxy Y, and in step 912 this new response is sent to the client device 304*a* over unicast.

This new response will appear to the client device 304*a* to be identical to that sent by the content server 304 to Proxy X, even though the path taken by the response is split over unicast and multicast for the respective client specific and common components.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of delivering content to a client device in a network comprising a plurality of client devices, said method comprising:
   i) sending a request for content to a content server from one of the client devices;
   ii) receiving at a first network node a response to the request from the content server over unicast;
   iii) separating by the first network node the response into a first component and a second component, wherein the first component comprises client specific data applicable to the client device requesting the content, and wherein the second component comprises common data applicable the plurality of client devices;
   iv) sending by the first network node the first component over a unicast network to a second network node, and sending the second component over a multicast network to the second network node;
   v) receiving the first and second components at the second network node;
   vi) regenerating by the second network node the response by combining the first component with the second component; and
   vii) sending the regenerated response to the requesting client device over unicast.

2. A method according to claim 1, wherein combining the first component with the second component uses a common identifier found in both the first and second components.

3. A method according to claim 1, wherein the request comprises an HTTP GET request.

4. A method according to claim 1, wherein the second component comprises the content requested.

5. A method according to claim 1, wherein the second component sent over a multicast network to a second network node is further sent to one or more other network nodes.

6. A method according to claim 1, wherein the second network node and one or more other network nodes form a cohort, and the second component comprises data applicable to the cohort.

7. A method according to claim 1, wherein the request for content is sent over a unicast network to the content server.

8. A method according to claim 1, wherein the content is media content.

9. A method according to claim 8, wherein the media content comprises a video sequence.

10. The method according to claim 1, wherein the client specific data in the first component is session specific data in a header of the response.

11. The method according to claim 1, further comprising:
   determining if the response contains a particular file type, and
   determining whether to separate the response into the first component and the second component based on the determination that the response contains the particular file type.

12. A system for delivering content to a client device in a network comprising a plurality of client devices, a first proxy server, a second proxy server, and a content server, wherein:
   the first proxy server is adapted to receive from the content server a response to a request for content over unicast, and to separate the response into a first component and a second component, wherein the first component comprises client specific data applicable to the client device requesting the content, and wherein the second component comprises common data applicable the plurality of client devices;
   the first proxy server further adapted to send the first component over a unicast network to the second proxy, and sending the second component over a multicast network to the second proxy server; and
   the second proxy server adapted to receive the first and second components, and to regenerate the response by combining the first component with the second component, and to send the regenerated response to the requesting client device over unicast.

13. The system according to claim 12, wherein combining the first component with the second component uses a common identifier found in both the first and second components.

14. The system according to claim 12, wherein the second component comprises the content requested, and the content requested is media content.

15. The system according to claim 12, wherein the request for content is sent over a unicast network to the content server.

16. The system according to claim 12, wherein the client specific data in the first component is session specific data in a header of the response.

17. The system according to claim 12, wherein:
   the first proxy server is further adapted to determine if the response contains a particular file type, and determine whether to separate the response into the first component and the second component based on the determination that the response contains the particular file type.

* * * * *